ns Patent [19]

Hamprecht

[11] 4,045,430
[45] Aug. 30, 1977

[54] CONVERSION OF o-HALOGENOAZO COMPOUND TO o-CYANOAZO COMPOUND BY REACTION WITH A ZINC CYANIDE

[75] Inventor: Rainer Hamprecht, Loevenich, Germany

[73] Assignee: Bayer Aktiengesellschaft, Leverkusen, Germany

[21] Appl. No.: 635,051

[22] Filed: Nov. 25, 1975

[30] Foreign Application Priority Data

Nov. 29, 1974  Germany .......................... 2456495

[51] Int. Cl.² .................. C09B 29/08; C09B 29/36; C09B 43/00
[52] U.S. Cl. .................................. 260/208; 260/156; 260/157; 260/158; 260/205; 260/206; 260/207; 260/207.1
[58] Field of Search ............ 260/156, 157, 158, 205, 260/206, 207, 207.1, 207.5, 465 R, 208

[56] References Cited
U.S. PATENT DOCUMENTS 3,821,195  6/1974  Putzig ................................. 260/206
3,876,621  4/1975  Hagen et al. ....................... 260/157

FOREIGN PATENT DOCUMENTS 170,871  4/1952  Austria ............................ 260/465 R
779,291  2/1968  Canada ............................ 260/207.1

Primary Examiner—Floyd D. Higel
Attorney, Agent, or Firm—Plumley & Tyner

[57] ABSTRACT

The invention relates to the preparation of o-cyanoazo dyestuffs by reaction of corresponding o-halogenoazo dyestuffs with zinc compounds of the formula

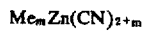

$Me_mZn(CN)_{2+m}$ wherein
  Me represents an alkali metal and
  m represents the numbers 0, 1 or 2 in the presence of small amounts of copper-I compounds.

The improvement of this process as compared with the well-known CuCN-method consists in that practically metalfree dyestuffs are obtained and—moreover—that it is cheaper than the conventional process.

9 Claims, No Drawings

CONVERSION OF O-HALOGENOAZO COMPOUND TO O-CYANOAZO COMPOUND BY REACTION WITH A ZINC CYANIDE

The subject of the present invention is a process for the preparation of practically metal-free o-cyanoazo dyestuffs by reaction of corresponding o-halogenoazo dyestuffs with metal cyanides.

It is already known from German Pat. No. 1,544,563 (corresponding to British patent specification No. 1,125,683) that such reactions take place very smoothly if they are carried out in polar aprotic solvents using equimolar amounts of CuCN.

However, the method which inherently is well-proven has the disadvantage that the cyanoazo dyestuffs which have crystallised out, or precipitated out, of the reaction mixture contain substantial amounts of copper-I salts.

However, the presence of copper salts is undersirable for many reasons.

For example, dyestuffs containing copper can frequently not be used for dyeing in mixtures with other dyestuffs sensitive to metal ions, since the latter dyestuffs under these circumstances tend to suffer changes in colour. At times, synthetic fibres which have been dyed with dyestuffs containing copper also suffer damage, or a descrese in the fastness to light is observed.

Hence, more or less expensive purification processes have been recommended for removing the copper-I compounds from o-cyanoazo dyestuffs.

Thus, for example, according to British patent specification No. 1,125,683 (= DOS (German Published Specification) No. 1,544,563), the procedure followed is that after completion of the reaction carried out using a copper-I salt, the dyestuff is precipitated conjointly with the copper-I salts, the filter cake is suspended in water, the copper-I salts are converted to water-soluble copper-II salts by means of customary oxidising agents, or converted to water-soluble complex compounds by means of customary complexing agents, and finally the water-insoluble dyestuffs are separated off by filtration, and washed until free from copper.

The process according to U.S. Pat. No. 3,772,268 is similar in principle, but special complex-forming agents are employed.

The previously known decoppering processes however have the disadvantage, in addition to mostly requiring two-stage working, that the entire copper passes into the effluent from which it must be separated out by precipitation reactions, because of its toxicity.

For these reasons the use of complex alkali metal/copper cyanides for the halogen-cyano exchange has already been proposed (compare DOS (German Published Specification) No. 2,341,109). However, the process is not satisfactory since copper is still retained in noticeable amounts in the dyestuff.

It has now been found that practically copper-free o-cyanoazo dyestuffs are obtained in a simple manner—without intermediate isolation and without contaminating the effluent with copper—if the corresponding o-halogenoazo dyestuffs are reacted with preferably stoichiometric amounts of compounds of the formula I

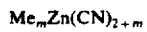  (I)

(or mixtures of substances which form these compounds), wherein

Me represents an alkali metal, such as sodium or potassium and m can assume the values 0–2, in the presence of small amounts of copper-I compounds. Preferably, however, zinc cyanide $Zn(CN)_2$ is employed as the zinc cyanide compound of the formula I.

The new process is particularly suitable for the preparation of practically copper-free azo dyestuffs of the formula

  (II)

from corresponding halogenoazo dyestuffs of the formula

  (III)

wherein
A denotes an aromatic-carbocyclic radical, preferably of the benzene or naphthalene series, or a benzisothiazole radical,
X denotes a halogen substituent, preferably chlorine or bromine, which is present in the radical A in the o-position relative to the azo group,
K denotes the radical of a coupling component and
n = 1 or 2.

Preferably, dyestuffs of the formula IV

  (IV)

and V

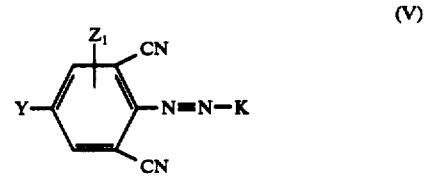  (V)

can be prepared in accordance with this new process. In these formulae

Y denotes hydrogen or a $-NO_2$, $-CN$, $-R_1$, $-OR_1$, $-CF_3$, $-SO_2R_1$,

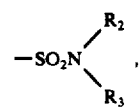

$-F$, $-Cl$, $-Br$, $-COR_4$ or $-N=N-R_5$ group, wherein
$R_1$ represents an optionally substituted alkyl, aralkyl, or aryl radical, $R_2$ and $R_3$ represent hydrogen or identical or different substituents which can also conjointly be part of a heterocyclic ring, $R_4$ represents hydrogen, —OH, or the radical —$R_1$, —$OR_1$ or

and $R_5$ represents aryl,

Z denotes hydrogen or substituents, amongst these preferentially the groups —$NO_2$, —CN, —$R_1$, —$OR_1$, —$CF_3$, —$SO_2R_1$,

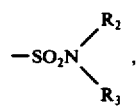

—Cl, —Br and —$COR_4$, and heterocyclic structures of the formula VI, VII and VIII

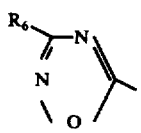
(VI)

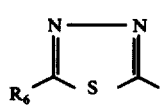
(VII)

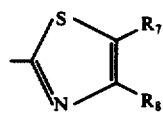
(VIII)

wherein $R_6$ represents hydrogen or $R_1$, $R_7$ represents methyl or, together with $R_8$, a fused benzene ring and $R_8$ represents —$CO_2CH_3$ or —$CO_2C_2H_5$, $Z_1$ denotes hydrogen or substituents, amongst these preferentially the groups —$NO_2$, —CN, —$R_1$, —$OR_1$, —$CF_3$, —$SO_2R_1$,

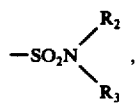

—Cl, —Br and —$COR_4$,
and wherein

Z and $Z_1$ can also conjointly form a fused isothiazole ring and

K has the meaning already indicated.

Suitable radicals K are radicals of coupling components of the benzene, naphthalene, indole, pyridine and tetrahydroquinoline series, but preferably N-substituted p-aminoarylene radicals and especially anilines of the formula IX

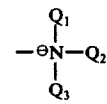
(IX)

wherein $R_9$ denotes hydrogen, alkyl, alkoxy, aryloxy, alkylcarbonylamino, aralkylcarbonylamino, cycloalkylcarbonylamino, arylcarbonylamino, heterylcarbonylamino, alkoxycarbonylamino, alkylsulphonylamino, arylsulphonylamino, aminocarbonylamino, CN, $CF_3$, carbamoyl, dialkylaminocarbonyl, alkoxycarbonyl, sulphamoyl, dialkylaminosulphonyl or alkylsulphonyl, $R_{10}$ denotes hydrogen, alkyl, aralkyl or aryl, $R_{11}$ denotes hydrogen, alkyl or aralkyl, and $R_{12}$ denotes hydrogen, alkyl, alkoxy, aryloxy, aralkoxy, halogen, CN, carboxyl or alkoxycarbonyl.

By the alkyl and alkoxy radicals mentioned above in any context (that is to say, for example, also including alkylsulphonyl or alkoxycarbonyl) there are preferably to be understood those radicals with 1–4 C atoms which are preferably monosubstituted by OH, CN, halogen, $C_1$–$C_4$-alkoxy, $C_2$–$C_5$-alkylcarbonyloxy or ammonium groups of the formula $$-\overset{\oplus}{N}\begin{array}{c}Q_1\\|\\Q_3\end{array}-Q_2$$

wherein $Q_1$, $Q_2$ and $Q_3$ denote alkyl, cycloalkyl, aralkyl or aryl or form the remaining members of a N-heterocyclic structure, such as pyridine, imidazole and triazole, whilst the aryl and aryloxy radicals are preferably to be understood as phenyl or phenoxy radicals which are optionally monosubstituted by Cl, Br, $NO_2$, CN, alkoxy($C_1$–$C_4$) or alkyl ($C_1$–$C_4$).

Very particularly preferentially it is possible to prepare, according to the new process, dyestuffs of the formula X

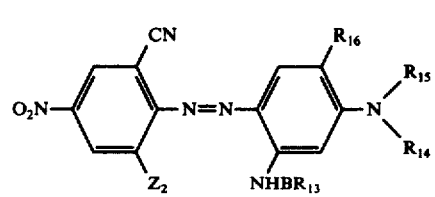
(X)

wherein $Z_2$ denotes nitro, cyano, trifluoromethyl, halogen, methylsulphonyl, ethylsulphonyl or propylsulphonyl, carbamoyl, N-methylcarbamoyl, N-ethylcarbamoyl, N,N-dimethylcarbamoyl, N,N-diethylcarbamoyl, sulphamoyl, N-methylsulphamoyl, N-ethylsulphamoyl, N,N-dimethylsulphamoyl and N,N-diethylsulphamoyl, B denotes —CO—, —$CO_2$— or —$SO_2$—, $R_{13}$ denotes alkyl, aralkyl, aryl or $NV_1V_2$, $V_1$ denotes hydrogen, alkyl, aralkyl or aryl, $V_2$ denotes hydrogen, alkyl or aralkyl,
$R_{14}$ denotes hydrogen, alkyl, aralkyl or aryl,
$R_{15}$ denotes hydrogen, alkyl or aralkyl and
$R_{16}$ denotes hydrogen, alkyl, alkoxy, aryloxy or aralkoxy
and the proviso that B = —CO— or —SO$_2$— if $R_{13}$ = $NV_1V_2$ is intended to apply.

By alkyl and alkoxy radicals there are here again to be understood those radicals with 1-4 C atoms which are preferably monosubstituted by OH, CN, halogen, $C_1$-$C_4$-alkoxy, or $C_2$-$C_5$-alkylcarbonyloxy, whilst the aryl and aryloxy radicals are preferably to be understood as phenyl or phenoxy radicals which are optionally monosubstituted by Cl, Br, $NO_2$, CN, alkoxy($C_1$-$C_4$) or alkyl($C_1$-$C_4$).

Suitable zinc cyanide compounds of the formula I are $NaZn(CN)_3$ and $KZn(CN)_3$, but particularly the complexes $Na_2Zn(CN)_4$ and $K_2Zn(CN)_4$ which are also readily soluble in organic solvents, and in particular $Zn(CN)_2$. Zinc cyanide and its cyanide complexes are easily accessible by reaction of zinc halides or zinc cyanide with alkali metal cyanides. They can be employed as such or can only be formed in the reaction medium.

The zinc cyanide (formula I, $m = O$) to be used according to the invention in the new process, and the $Zn(CN)_2$ contained in the zinc cyanide complexes, is converted practically quantitatively, during the halogen/cyano exchange process, to the corresponding zinc halides—in the case of the preferred use of o-bromoazo dyestuffs to $ZnBr_2$—which are readily soluble in the polar solvents wherein such reactions are usually carried out.

The copper compounds which in general are markedly less soluble also remain practically completely in solution, since they are employed in substantially lower amounts than in the conventional process. For this reason the new process gives directly, without additional purification processes, the desired o-cyanoazo dyestuffs in a partically metal-free form (that is to say zinc and copper <0.1%).

The same applies to the alkali metal halides formed as by-products when using alkali metal/zinc cyanide complexes of the formula I with $m = 1$ or 2; these halides are in some cases soluble, or alternatively can easily be eluted with water.

The amount of the copper-I compound to be employed according to the invention varies and essentially depends on the solubility of the compound in the particular solvent used, on the nature of the solvent and at times on the type of dyestuff. They optimum amount can in each case easily be determined by simple preliminary experiments.

In general, 0.1 to 20 mol percent, preferably 2.0 to 10 mol percent, of copper-I compound (relative to halogen to be exchanged) are used.

Examples of copper-I compounds which can be used are $Cu_2O$, CuCl and CuI, but preferably CuBr and especially CuCN. In addition it is also possible to produce the copper-I salts in the reaction medium from copper-II compounds, for example by reaction of copper-II salts with cyanide ions with or without action of a reducing agent such as, for example, sulphite ions, or by reduction of copper-II salts with other suitable reducing agents.

If copper cyanide is used as the copper-I compound, the proportion is preferably so chosen that the sum of cyanide from copper cyanide and $Me_mZn(CN)_{2+m}$ bears a stoichiometric relationship to the halogen to be replaced. When other copper-I compounds are used as the catalyst, zinc cyanides of the formula I are preferably employed in stoichiometric amounts.

A larger excess of zinc cyanides in most cases results in higher concentrations of zinc, copper and cyanide in the dyestuff.

Suitable solvents are all solvents hitherto described for the halogen-cyano exchange. These include polar protic solvents, such as monoalkyl ethers of ethylene glycol and diethylene glycol and above all polar aprotic solvents, such as, for example, the optionally nitrogen-alkylated carboxylic acid amides and lactams, dialkylsulphoxides, trialkyl phosphates, hexaalkylphosphoric acid triamides and carboxylic acid nitriles.

The following may be mentioned as examples: glycol monomethyl ether, glycol monoethyl ether, diethylene glycol monomethyl ether, diethylene glycol monoethyl ether, N,N-dimethylformamide, N,N-dimethylacetamide, N-methylpyrrolidone, tetramethylurea, dimethylsulphoxide, tetramethylenesulphone, triethyl phosphate, hexamethylphosphoric acid triamide and acetonitrile. Water can also be used. The reaction temperature is in general between 20° and 220° C, temperatures between 20° and 150° C being preferred.

After the end of the reaction the reaction products can, if required, be precipitated by polar solvents. Readily volatile, organic solvents such as acetone and chloroform, but especially water and particularly polar, protic solvents, such as lower alcohols with 1-4 carbon atoms are suitable for this purpose.

The new process is a decisive improvement since it permits the preparation of cyanoazo dyestuffs containing very little copper, the residual copper content being <0.1%, without intermediate isolation, by a simple and rapid one-pot process. Further advantages are that only a fraction of the amounts of copper hitherto customary is required for the preparation of the dyestuff. Furthermore, no cocatalysts, such as, for example, nitrogen bases, have to be employed in the new process. The yield and purity of the dyestuffs obtained according to the zinc cyanide process are at least equal to, and in some cases even better than, those obtained by the copper cyanide process.

Since, in the isolation or precipitation of the cyanoazo dyestuffs, the product is preferably rinsed, or precipitated, with polar organic solvents, such as, for example, methanol, all heavy metal salts remain dissolved in the organic phase. Accordingly, contamination of the effluent with toxic effluents containing heavy metals and cyanide is avoided.

The solvent or solvent mixture such as, for example, dimethylformamide/methanol, which is present in the filtrate from the cyanoazo dyestuff can then easily be recovered and/or separated by distillation.

Because of the monofunctional CuCN being largely replaced by the difunctional $Zn(CN)_2$, the organic mother liquor of the azo dyestuff contains very much less inorganic salts, so that on distillation of this mother liquor a very much greater proportion of solvents can be recovered.

EXAMPLE 1

Preparation of the dyestuff of the formula

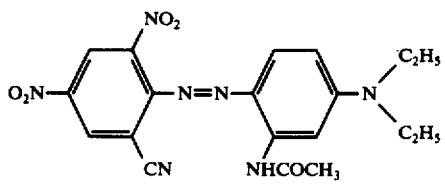

A mixture of 277 g of 3-acetamino-4-(2'-bromo-4',6'-dinitrophenylazo)-N,N-diethylaniline, 1.3 g of copper-I cyanide, 33.4 g of zinc cyanide and 500 ml of dimethylformamide is heated to 100° C over the course of 1 hour, whilst stirring. The mixture is then stirred for a further 30 minutes at this temperature after which it is allowed to cool to 75° C and the dyestuff is precipitated by adding 1 l of methanol. After cooling to room temperature, the product is filtered off and washed with 200 ml of methanol, 300 ml of 10% strength hydrochloric acid and 2 l of water. The yield of dry, chromatographically pure dyestuff, is 230 g, corresponding to 93.5% of theory. The copper content is about 0.01% and the zinc content about 0.02%.

EXAMPLE 1a

A mixture of 34.6 g of 3-acetamino-4-(2'-bromo-4',6'-dinitrophenylazo)-N,N-diethylaniline, 0.3 g of copper-I cyanide and 100 ml of dimethylformamide is warmed to 100° C, whilst stirring. At this temperature, the filtered solution of 1.7 g of sodium cyanide and 2.3 g of zinc cyanide (about 90% strength) in 50 of dimethylformamide is added dropwise over the course of 30 minutes and the mixture is stirred for a further hour at 100° C. After cooling to 80° C, 125 ml of methanol are added and the mixture is allowed to cool to room temperature. The product is filtered off and washed with 30 ml of methanol and 500 ml of water. The yield of pure dry dyestuff is 24.2 g. The copper content and zinc content are less than 0.1%.

EXAMPLE 2

Preparation of the dyestuff of the formula

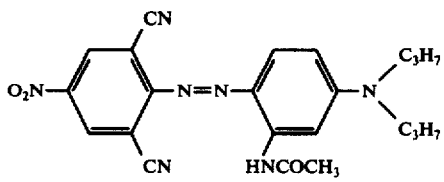

A mixture of 78.5 g of 3-acetamino-4-(2',6'-dibromo-4'-nitrophenylazo)-N,N-dipropylaniline and 175 ml of dimethylformamide is stirred overnight. It is heated to 40° C, 17.6 g of zinc cyanide and 0.65 g of copper cyanide are added and the mixture is then heated to 100° C over the course of 30 minutes, whilst stirring. It is kept at 100° C for a further hour and is then allowed to cool to 75° C, and the dyestuff is precipitated with 200 ml of methanol. After cooling to room temperature, the dyestuff is filtered off and washed with 50 ml of methanol, 125 ml of 10% strength hydrochloric acid and then with 1 l of water. The yield of dry dyestuff is 57.7 g, corresponding to 92% of theory. The copper content is 0.009% and the zinc content 0.014%.

EXAMPLE 3

Preparation of the dyestuff of the formula

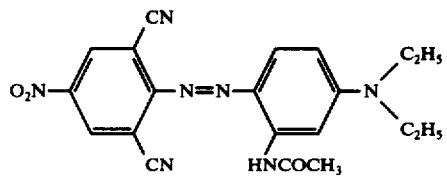

74.2 g of 3-acetamido-4-(2',6'-dibromo-4'-nitrophenylazo)-N,N-diethylaniline in 175 ml of dimethylformamide are stirred overnight. 17.61 g of zinc cyanide and 0.65 g of copper-I cyanide are added, the mixture is warmed to 110° C over the course of 30 minutes, whilst stirring, and this temperature is maintained for 2 hours. After cooling to 80° C, the dyestuff is precipitated with 250 ml of methanol. The mixture is allowed to cool to room temperature and the dyestuff is filtered off and washed with 125 ml of methanol, 125 ml of 10% strength hydrochloric acid and 1 l of water. The yield of dry dyestuff is 53.4 g, corresponding to 91% of theory. The copper content and zinc content are less than 0.1%.

The dyestuffs listed in the table which follows can be prepared in good yields, and with copper and zinc contents of <0.1%, on following an analogous or similar procedure.

| Example No. | Structure |
|---|---|
| 4 | ![structure with O2N, CN, N=N, HNCOCH3, N(CH2CH2CN)(CH2CHCH2 with OH, Cl)] |
| 5 | ![structure with O2N, CN, N=N, HNCOCH3, N(CH2CH2CN)(CH2CHCH2 with OH, OH)] |

-continued
| Example No. | Structure |
|---|---|
| 6 | 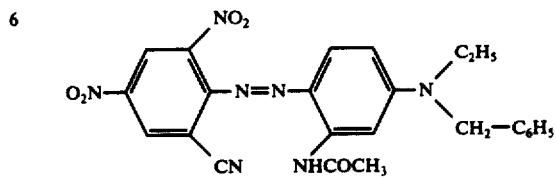 |
| 7 | 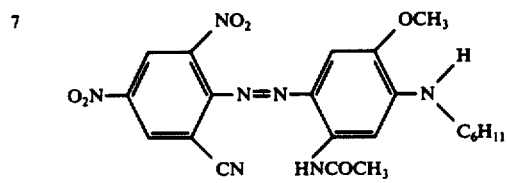 |
| 8 | 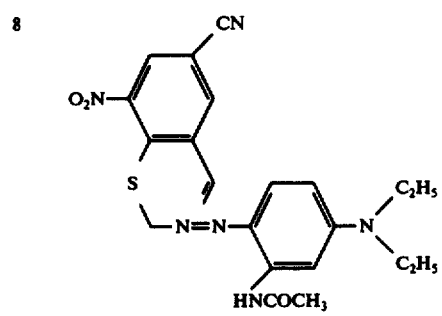 |
| 9 | 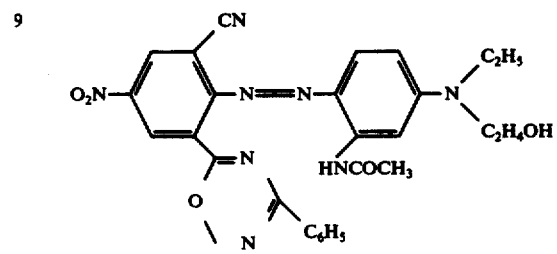 |
| 10 | 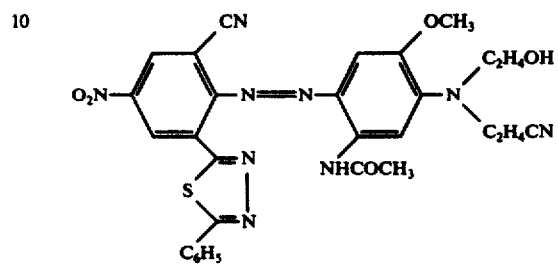 |
| 11 | 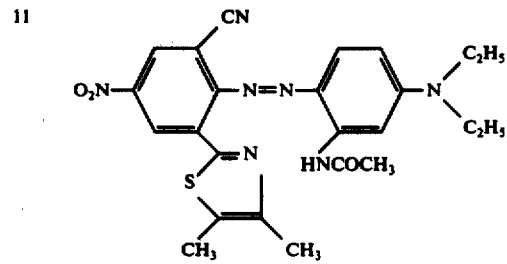 |
| 12 | 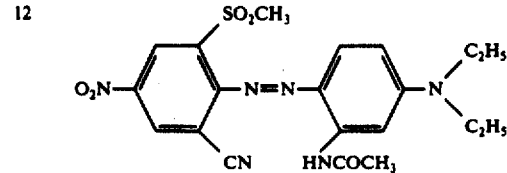 |

-continued
| Example No. | Structure |
|---|---|
| 13 | 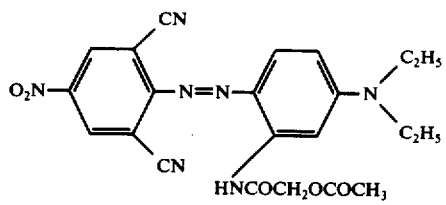 |
| 14 | 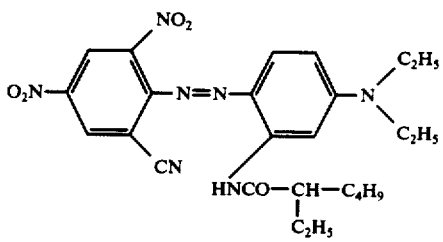 |
| 15 | 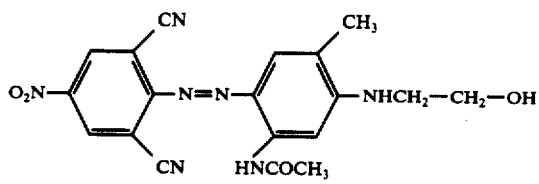 |
| 16 | 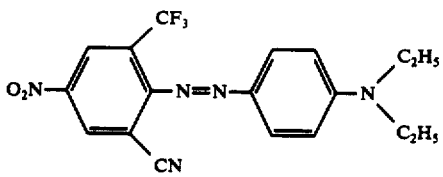 |
| 17 | 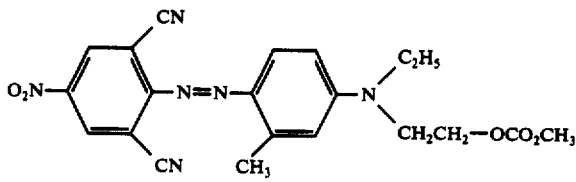 |
| 19 | 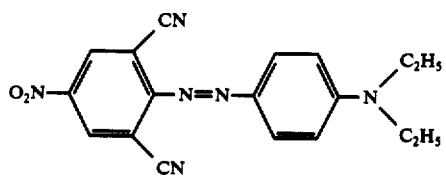 |
| 20 | 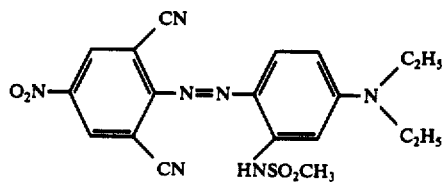 |
| 21 | 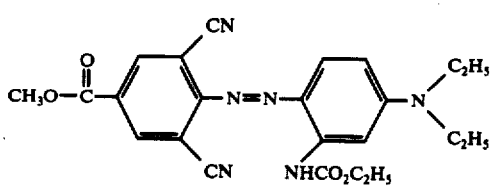 |

-continued

| Example No. | Structure |
|---|---|
| 22 | 4-(CH₃-SO₂)-2,6-(CN)₂-C₆H₂-N=N-C₆H₃(NHCOCH₃)-N(C₄H₉)₂ |
| 23 | 4-Cl-2,6-(CN)₂-C₆H₂-N=N-C₆H₃(HNCONH₂)-N(CH₂CH₂OH)₂ |
| 24 | 4-(F₃C)-2,6-(CN)₂-C₆H₂-N=N-C₆H₃(NHCO₂CH₃)-N(C₂H₅)₂ |
| 25 | 4-(CH₃-CONH)-2,6-(CN)₂-C₆H₂-N=N-C₆H₃(NHCOCH₃)-N(CH₂CH₂OH)(C₂H₅) |
| 26 | C₆H₅-N=N-[2,6-(CN)₂-C₆H₂]-N=N-C₆H₃(HNCOCH₃)-N(C₂H₅)(CH₂-C₆H₅) |
| 27 | 4-O₂N-2,6-(CN)₂-C₆H₂-N=N-C₆H₃(NHCOCH₂N(CH₃)₃⁺ Cl⁻)-N(C₂H₅)₂ |
| 28 | 4-O₂N-2,6-(CN)₂-C₆H₂-N=N-C₆H₂(OCH₃)(NHCOC₂H₅)-NH-CH₂-CH(OH)-CH₂-N⁺(pyridinium) Cl⁻ |
| 29 | 4-O₂N-2-CH₃-6-CN-C₆H₂-N=N-C₆H₃(NHCOCH₃)-N(C₂H₅)(CH₂-CH₂-CN) |
| 30 | 2,4-Cl₂-6-CN-C₆H₂-N=N-C₆H₂(CH₃)(NHCOC₂H₅)-NH-CH₂-CH₂-OH |

I claim:

1. In a process for the preparation of a substantially metal-free o-cyanoazo dyestuff by reaction of the corresponding o-halogenoazo dyestuff with a metal cyanide, the improvement which comprises employing as the metal cyanide a zinc compound of the formula $$Me_mZn(CN)_{2+m}$$

wherein

Me is an alkali metal and m is the number 0, 1, or 2, in the presence of 0.1–20 mol percent of a copper-I compound based on the exchangeable halogen in said o-halogenoazo dyestuff at a reaction temperature of 20°–150° C, and recovering the desired o-cyanoazo dyestuff containing less than 0.1% copper and zinc.

2. Process according to claim 1, characterised in that 0.90 to 0.98 equivalent of $Me_mZn(CN)_{2+m}$ and 0.10 to 0.02 equivalent of CuCN, relative to halogen to be replaced, are used.

3. Process according to claim 1, characterised in that the reaction is carried out in a polar aprotic solvent.

4. Process according to claim 3, characterised in that the polar aprotic solvent used is N,N-dimethylformamide, N,N-dimethylacetamide, N-methylpyrrolidone, tetramethylurea, dimethylsulphoxide, tetramethylenesulphone, triethyl phosphate or hexamethylphosphoric acid triamide.

5. Process according to claim 1, characterised in that the reaction is carried out in ether alcohol as a solvent.

6. Process according to claim 5, characterised in that the solvent is glycol monomethyl ether, glycol monoethyl ether, diethylene glycol monomethyl ether or diethylene glycol monoethyl ether.

7. The process of claim 1 wherein said zinc compound is formed in situ by reaction of an alkali metal cyanide with zinc halide or zinc cyanide.

8. The process of claim 1 wherein said zinc compound is $Zn(CN)_2$.

9. The process of claim 1 wherein said copper-I compound is $Cu_2O$, CuCl, CuBr, CuI, or CuCN.

* * * * *